(12) United States Patent
Shaw et al.

(10) Patent No.: US 10,805,879 B2
(45) Date of Patent: Oct. 13, 2020

(54) LOW-POWER ACTIVATION OF ACCESSORY IN SLEEP STATE

(71) Applicant: APPLE INC., Cupertino, CA (US)

(72) Inventors: David Shaw, Ramona, CA (US); Ariane Cotte, San Francisco, CA (US); Alon Paycher, Beit Hananya (IL); Robert Watson, Menlo Park, CA (US); Gregory Burns, San Francisco, CA (US); Chandrahas Aralaguppe Chandramohan, San Jose, CA (US); Sriram Hariharan, San Jose, CA (US); Jonathan Shavit, Sunnyvale, CA (US); Adir Eini, Kadima (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/144,493

(22) Filed: Sep. 27, 2018

(65) Prior Publication Data

US 2020/0107262 A1    Apr. 2, 2020

(51) Int. Cl.
| | |
|---|---|
| H04W 52/02 | (2009.01) |
| H04W 76/28 | (2018.01) |
| H04W 76/14 | (2018.01) |
| H04W 4/80 | (2018.01) |
| H04W 76/11 | (2018.01) |
| H04W 8/00 | (2009.01) |

(52) U.S. Cl.
CPC ......... *H04W 52/0216* (2013.01); *H04W 4/80* (2018.02); *H04W 8/005* (2013.01); *H04W 76/11* (2018.02); *H04W 76/14* (2018.02); *H04W 76/28* (2018.02)

(58) Field of Classification Search
None
See application file for complete search history.

(56) References Cited

U.S. PATENT DOCUMENTS

| | | |
|---|---|---|
| 9,037,086 B2 | 5/2015 | Sun |
| 9,066,327 B2 | 6/2015 | Liu |
| 9,119,157 B2 | 8/2015 | Shrivastava et al. |
| 9,544,075 B2 | 1/2017 | Altman et al. |
| 9,892,353 B1 * | 2/2018 | Lui .................... G06K 17/0022 |
| 2009/0061770 A1 * | 3/2009 | Agardh ............ H04W 52/0225 455/41.2 |

(Continued)

FOREIGN PATENT DOCUMENTS

| | | |
|---|---|---|
| KR | 10-2015-0026263 | 3/2015 |
| KR | 10-2016-0110006 | 9/2016 |

*Primary Examiner* — Otis L Thompson, Jr.
(74) *Attorney, Agent, or Firm* — Fay Kaplun & Marcin, LLP

(57) ABSTRACT

A first device is configured to establish a connection over a short-range communication link with a second device. The first device may transition to a sleep state, terminate (i) a paging operation and a page scanning operation associated with a paging protocol and (ii) an advertisement scanning operation associated with an advertisement protocol and perform an advertisement broadcast operation associated with the advertisement protocol, the advertisement broadcast operation generating an advertisement to be broadcast at a first interval, wherein the first interval is greater than a second interval for performing advertisement broadcast operations in an active state.

20 Claims, 6 Drawing Sheets

(56) References Cited

U.S. PATENT DOCUMENTS

| | | | |
|---|---|---|---|
| 2009/0252128 A1* | 10/2009 | Yang | H04B 1/715 370/338 |
| 2010/0093279 A1* | 4/2010 | Linsky | H03L 7/183 455/41.2 |
| 2011/0021142 A1* | 1/2011 | Desai | H04W 8/005 455/41.2 |
| 2011/0171937 A1* | 7/2011 | Hill | H04B 5/0031 455/412.2 |
| 2012/0195387 A1* | 8/2012 | Masuda | H04M 1/7253 375/259 |
| 2014/0018068 A1* | 1/2014 | Julian | H04W 68/02 455/434 |
| 2014/0073252 A1* | 3/2014 | Lee | H04M 1/72522 455/41.2 |
| 2014/0086125 A1* | 3/2014 | Polo | H04W 52/0229 370/311 |
| 2014/0154986 A1* | 6/2014 | Lee | H04B 7/26 455/41.2 |
| 2014/0154987 A1* | 6/2014 | Lee | H04W 4/80 455/41.2 |
| 2014/0155031 A1* | 6/2014 | Lee | H04W 4/20 455/411 |
| 2014/0157135 A1* | 6/2014 | Lee | H04W 76/14 715/738 |
| 2015/0163748 A1* | 6/2015 | Hrabak | H04W 52/0245 455/41.2 |
| 2015/0230171 A1 | 8/2015 | Sun | |
| 2016/0100276 A1 | 4/2016 | Viswanadham et al. | |
| 2016/0128105 A1 | 5/2016 | Dunsbergen et al. | |
| 2017/0026777 A1 | 1/2017 | Denboer et al. | |
| 2017/0064619 A1* | 3/2017 | Neelisetty | H04W 16/14 |
| 2017/0195957 A1* | 7/2017 | Debates | H04W 52/0222 |
| 2017/0230902 A1* | 8/2017 | Park | H04W 48/10 |
| 2018/0098388 A1 | 4/2018 | Jeong et al. | |
| 2018/0288569 A1* | 10/2018 | Wang | H04W 4/023 |
| 2019/0090119 A1* | 3/2019 | Ballam | H04W 4/80 |
| 2019/0098675 A1* | 3/2019 | Paycher | H04W 76/14 |
| 2019/0191074 A1* | 6/2019 | Ikeda | H04N 5/23293 |
| 2019/0246353 A1* | 8/2019 | Jensen | H04W 4/80 |
| 2019/0371098 A1* | 12/2019 | Meadow | G01S 5/10 |

* cited by examiner

LOW-POWER ACTIVATION OF ACCESSORY IN SLEEP STATE

BACKGROUND INFORMATION

A short-range communication protocol enables a short-range communication to be exchanged between two or more devices. The short-range connection may be established manually or automatically. The manual approach may enable more control in establishing the link and may only cause connection operations to be used when activated. However, the manual approach may be time consuming. The automated approach may be more time efficient and require little or no input, which may provide an improved user experience. However, the automated approach may perform connection operations at predetermined times, potentially utilizing an increased amount of power from a limited power supply. To further improve the automated approach, a detection protocol may be used based on, for example a Bluetooth configuration including a paging protocol and an advertisement protocol.

Once the short-range communication link is established, a first device may exchange data with a second device. For example, the first device may be a source device that provides audio data to the second device. The second device may receive the audio data and generate an audio output that is played on an audio component of the second device. The short-range communication link may be maintained until the user selects to discontinue use. For example, when the second device is an audio output component such as earbuds or an earpiece that is worn, the user may remove the second device (e.g., removing from the ears, removing from the head, etc.). The short-range communication link may no longer be used for data exchanges other than control data exchanges. In this manner, the second device may be placed into a low-power state such as a sleep state.

The sleep state may enable the second device to conserve power by modifying the manner in which certain operations are performed. However, as noted above, the automated approach may be maintained where the connection operations continue to be performed. For example, to provide the improved user experience, the automated approach may continue so that the short-range communication link may be re-established at any time that the user selects to resume use of the second device. However, when the automated approach is used during the sleep state, the second device will continue to draw power for the connection operations including the paging protocol and the advertisement protocol. Thus, even when the sleep state is maintained for longer durations, the second device continues to draw power from a limited power supply to perform operations related to the automated connection approach. When the second device has stayed in the sleep state for a sufficient duration and depending on a remaining power of the limited power supply, the second device may drain the limited power supply so that the user must recharge the second device before any use is to be resumed, thereby negatively impacting a user experience.

SUMMARY

In an exemplary embodiment, a method is performed by a first device configured to establish a connection over a short-range communication link with a second device. The method includes transitioning the first device to a sleep state, terminating (i) a paging operation and a page scanning operation associated with a paging protocol and (ii) an advertisement scanning operation associated with an advertisement protocol; and performing an advertisement broadcast operation associated with the advertisement protocol, the advertisement broadcast operation generating an advertisement to be broadcast at a first interval, wherein the first interval is greater than a second interval for performing advertisement broadcast operations in an active state.

In another exemplary embodiment, a first device configured to establish a connection via a short-range communication link with a second device is described. The first device has a transceiver and a processor. The transceiver is configured to establish the connection. The processor is configured to transition the first device to a sleep state, the processor instructing the transceiver to terminate (i) a paging operation and a page scanning operation associated with a paging protocol or (ii) an advertisement scanning operation associated with an advertisement protocol and instructs the transceiver to perform an advertisement broadcast operation associated with the advertisement protocol, the advertisement broadcast operation generating an advertisement to be broadcast at a first interval greater than a second interval for performing advertisement broadcast operations in an active state.

In a still further exemplary embodiment, a method is performed by a first device configured to establish a connection over a short-range communication link with a second device. The method includes transitioning the first device from a sleep state to a non-sleep state, activating a page scanning operation associated with a paging protocol to listen for a page from the second device and updating an advertisement broadcast operation associated with an advertisement protocol, the advertisement broadcast operation generating an advertisement to be broadcast at a first interval that is less than a second interval for performing advertisement broadcast operations during the sleep state, wherein a paging operation associated with the paging protocol and an advertisement scanning operation associated with the advertisement protocol remain inactive.

DETAILED DESCRIPTION

Figure 1:
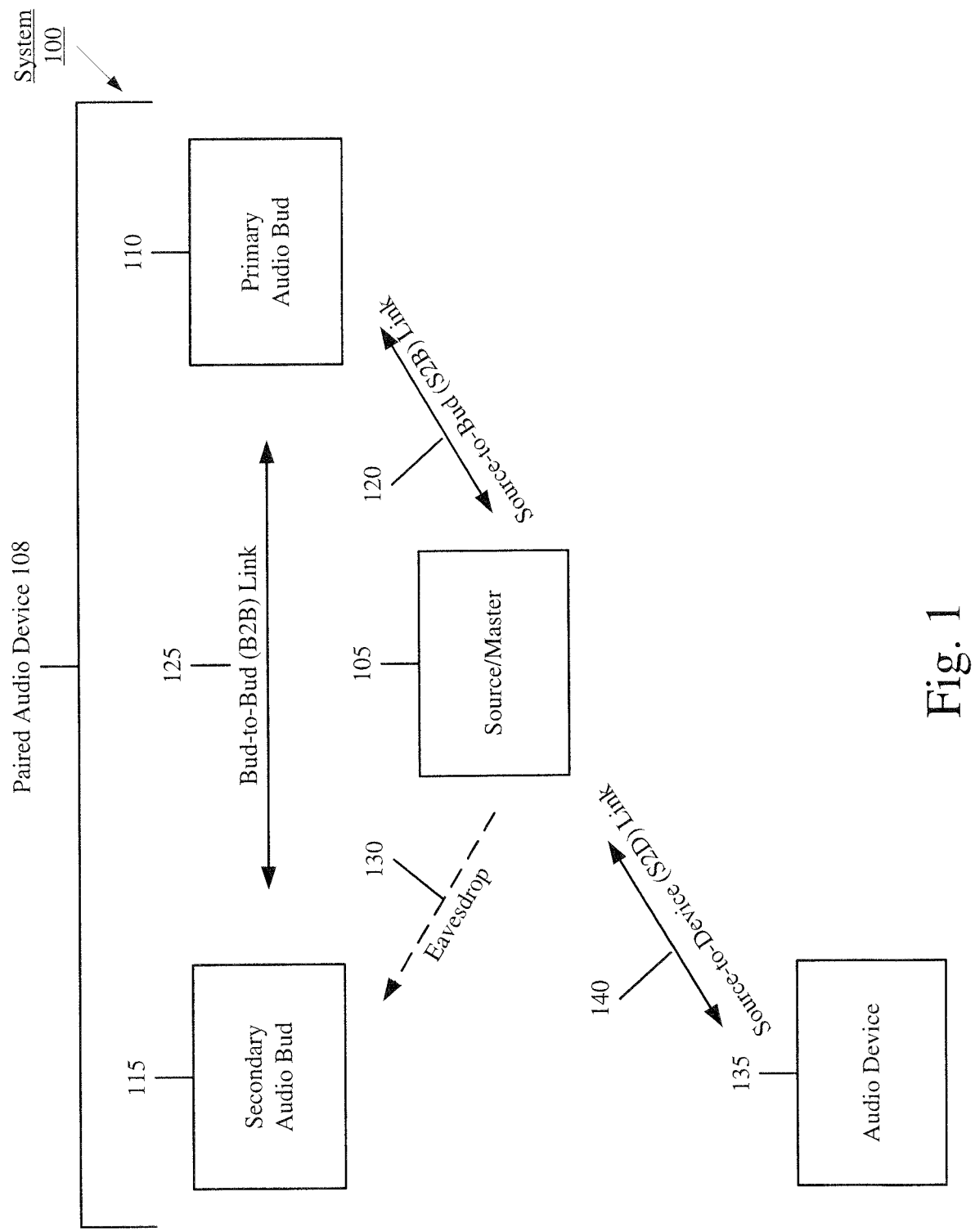
FIG. 1 shows an example system of components utilizing short-range communicaiton links according to various exemplary embodiments described herein.

The exemplary embodiments may be further understood with reference to the following description and the appended drawings, wherein like elements are referred to with the same reference numerals. The exemplary embodiments describe devices, systems, and methods to reduce or minimize power use while in a sleep state, e.g., when an automated approach is used to establish a short-range communication link. The exemplary embodiments include a first aspect when the sleep state is identified, which defines how connection operations of the automated approach are to be used while an accessory device is in the sleep state. The exemplary embodiments also include a second aspect when the accessory device transitions to a wake state or a use state from the sleep state, which triggers further connection operations on the accessory device to automatically establish the short-range communication link with a source device. In this manner, the exemplary embodiments provide mechanisms whereby a short-range communication link may be established in a relatively short amount of time when the accessory device is to be used and conserves more power while the accessory device is in a low power state.

The exemplary embodiments are described herein with regard to establishing a short-range communication link (or connection) where the short-range communication link is a Bluetooth link. However, the use of the Bluetooth link is only exemplary and the Bluetooth link may represent (or be replaced by) any short-range communication link. Furthermore, the use of a short-range communication link is also only exemplary and the exemplary embodiments may be used or modified for any type of connection between two or more devices (e.g., a medium- or long-range connection). The exemplary embodiments, as described herein, include an advertising scheme that relates to broadcasting an identification (or identifier) and a scanning operation to detect the broadcast identification/identifier. However, the use of this type of advertising scheme is only exemplary and the exemplary embodiments may be used or modified for any lower power, fast detecting identification scheme. The exemplary embodiments are described herein with regard to the Bluetooth link being established between an accessory device and a source device. However, the use of this accessory and source configuration is only exemplary and the exemplary embodiments may be used or modified for any two or more devices that are to establish a connection using the mechanism described herein. That is, there is no requirement that one of the devices be subordinate to the other device. The use of the terms source device and accessory device are only for the convenience of distinguishing between the two devices in this description. In addition, the exemplary embodiments are described herein with regard to a sleep state. However, the sleep state may represent any lower power state in which some or all of the device's capabilities and/or components are powered down or otherwise configured in a lower power consumption state than normal operation. In addition, a component being powered down does not require that the component draws no power, only less than an amount of power that is drawn during normal, fully operational conditions. The exemplary embodiments are described with respect to when a device is likely to be used. A likely use may relate to when information is assessed to determine a probability that indicates a likelihood of the device being used.

Wireless communication systems and protocols are being developed to further increase the types of usage and the types of devices that may be connected in this manner. One type of wireless communication system may utilize a personal area network ("PAN") that may be defined as a computer network used for data transmission amongst a plurality of devices. For example, a PAN may be used for communications between the devices themselves (e.g., interpersonal communication), or for connecting one or more devices to a higher-level network and/or the Internet via an uplink, wherein one "master" (or primary) device may assume the responsibility of performing the operations associated with a router. Furthermore, a wireless PAN may be a network for interconnecting devices using short-range wireless technologies, such as a Bluetooth protocol.

Within the wireless PAN, certain applications or operations may be considered to use a relatively large amount of power, while others may be considered to use a relatively low amount of power. Similarly, certain applications or operations may be considered to require a relatively large amount of time, while others may be considered to require a relatively small amount of time. For example, with regard to a Bluetooth connection, relatively speaking, a Bluetooth paging/page scan operation may utilize both more power and more time than a Bluetooth advertising scheme. The Bluetooth paging/page scan operations may be based on the Bluetooth protocol that defines how the Bluetooth connection operations are performed. The Bluetooth advertising scheme may relate to a protocol in which low energy application profiles send and receive short pieces of data over a low energy link. The profiles may provide standards, which manufacturers follow to allow devices to use specific technologies, such as Bluetooth, in the intended manner. One such advertising scheme has been defined as Bluetooth low energy (hereinafter referred to as "BLE") or "Bluetooth Smart" which is a wireless PAN technology designed and marketed by the Bluetooth Special Interest Group, e.g., aimed at applications in the healthcare, fitness, location, beacon, security, and home entertainment industries. As noted above, compared to Classic Bluetooth (or Bluetooth Classic) that includes the Bluetooth paging/page scan operations, BLE is intended to provide considerably reduced power consumption and cost while maintaining a similar communication range as well as reducing a time used by Bluetooth devices to identify proximity and capability of establishing a Bluetooth connection. However, even with the BLE protocol being used in the automated approach in establishing the Bluetooth link, particularly when a device is in a low power state, the Bluetooth page scan operation as well as the BLE scanning operation are maintained to receive any pages or advertisements, respectively, that may be broadcast. As noted above, these operations may use more time and/or power.

The exemplary embodiments are configured to reduce or minimize the amount of power drawn while an accessory device is in a sleep state. As will be described in further detail below, upon entering the sleep state, the exemplary embodiments may terminate Bluetooth page and page scan operations as well as BLE scanning operations and maintain only BLE advertisement operations to detect source devices in a modified manner where an increased interval is used. To exit the sleep state when a use of the accessory device is likely, the accessory device may receive a request from a source device or detect the likely use of the accessory device. In confirming the source device as an allowed device, the accessory device may initiate the Bluetooth paging and page scan operations for the Bluetooth connection to be established. In removing the Bluetooth paging and page scan operations as well as the BLE scanning operations upon the accessory device entering the sleep state and modifying further connection operations, the radio on the accessory device may be used significantly less and allow for improved power performance.

FIG. 1 shows a system 100 of components utilizing short-range communication links according to the exemplary embodiments. The system 100 illustrates a possible network of short-range connections either between a source device 105 and a paired audio device 108 including a primary audio bud 110 and a secondary audio bud 115 or between the source device 105 and an audio device 135. The system 100 shows when the short-range connections have been established between the source device 105 and accessory devices (e.g., the paired audio device 108 or the audio device 135). However, as the exemplary embodiments are directed to durations when the short-range communication link is not established and subsequently establishing the short-range communication link, the illustrated short-range communication links may not be continuously active. The paired audio device 108 may be a system that includes two untethered audio buds 110, 115, e.g., there is no wired connection between the audio buds 110, 115, but they are designed to work in conjunction with each other. For example, the first audio bud 110 may output the right channel of audio that is streamed from the source device 105 and the second audio bud may output the left channel of audio that is streamed from the source device 105. As will be described in greater detail below, when outputting data received from the source device 105, one of the audio buds will take on a primary role of having a direct wireless connection with the source device 105 (e.g., the primary audio bud 110), while the other audio bud will take on a secondary role of having an indirect wireless connection with the source device and a direct connection to the primary audio bud (e.g., the secondary audio bud 115).

A first short-range communication link that may be established may be between the source device 105 and the primary audio bud 110 of the paired audio device 108 via a source-to-audio bud (S2B) link 120. A second short-range communication link that may be established may be between the primary audio bud 110 and the secondary audio bud 115 in the paired audio device 108 via an audio bud-to-audio bud (B2B) link 125. The secondary audio bud 115 may also be configured to perform an eavesdrop 130 (or snoop) on communications (e.g., data) being exchanged on the S2B link 120 or being broadcast/transmitted by the source device 105. A third short-range communication link that may be established may be between the source device 105 and the audio device 135 via a source-to-device (S2D) link 140. The S2D link 140 may be substantially similar to the S2B link 120. The system 100 may also include further short-range communication links, such as between the source device 105 and the secondary audio bud 115 (not shown). In some examples, the short-range communication links may be Bluetooth connections.

Under conventional approaches (e.g., as defined by Classic Bluetooth protocols), the S2B link 120 and/or the S2D link 140 may be established using a manual approach in which a user manually selects a device. For example, when both the primary audio bud 110 and the audio device 135 are available to the source device 105 to establish the short-range communication link, the source device 105 may detect these devices and display the devices in a list that allows the user to select one of these devices for connection. In contrast, the B2B link 125 may be established using an automated approach in which proximity detection and/or the capability of establishing the B2B link 125 is constantly being performed (e.g., at predetermined intervals). As will be described in detail below, the S2B link 120, the B2B link 125, and the S2D link 140 may each be established using an automated approach according to the exemplary embodiments.

The source device 105 may be any electronic device capable of establishing the S2B link 120 and/or the S2D link 140. For example, the source device 105 may be a mobile device (e.g., a mobile computing device, a mobile phone, a tablet computer, a personal computer, a VoIP telephone, a personal digital assistant, a wearable, a peripheral, an Internet of Things (IoT) device, etc.) or a stationary device (e.g., a desktop terminal, a server, an IoT device, etc.). The paired audio device 108, including the primary audio bud 110 and the secondary audio bud 115, may be any plurality of wireless audio output components used together (e.g., ear buds). Specifically, the primary audio bud 110 and the secondary audio bud 115 may be untethered to the source device 105 as well as to each other. The audio device 135 may be any unitary wireless audio output component (e.g., wireless headphones, speakers, etc.). Specifically, the audio device 135 may be untethered to the source device 105, but may utilize a tethered arrangement for a plurality of audio output sub-components. The use of audio related devices such as the audio buds and audio devices is only exemplary. The exemplary embodiments may be used to establish a short-range communication link between any type(s) of device(s). Thus, the primary audio bud 110, the secondary audio bud 115, and the audio device 135 may represent any electronic device(s) including the above noted types for the source device 105 as well as other types (e.g., an accessory device). For example, the primary audio bud 110, the secondary audio bud 115, and the audio device 135 may also be Bluetooth-enabled hands-free headsets, wireless speakers, intercoms, fitness tracking devices, sensors, automobile sound systems, etc.

In the system 100, the source device 105 and either the primary audio bud 110 or the audio device 135 may have a master/slave (or primary/secondary) relationship over the S2B link 120 or the S2D link 140, respectively. Specifically, the source device 105 may be a master component while the primary audio bud 110 or the audio device 135 may be a slave component. Similarly, the primary audio bud 110 and the secondary audio bud 115 may have a master/slave relationship over the B2B link 125. Specifically, the primary audio bud 110 may be a master component while the secondary audio bud 115 may be a slave component. However, the master/slave relationship is only exemplary. According to another exemplary embodiment, the components connected via the short-range communication links may have a mutual relationship (e.g., peer to peer) where neither component has a priority (e.g., sharing an equal priority) or neither component has predetermined operations that must be performed (e.g., the predetermined operations may have shared or the duty to perform may be shared). In yet another exemplary embodiment, the master/slave relationship may be dynamically set. For example, if the primary audio bud 110 is initially set as the master component while the secondary audio bud 115 is initially set as the slave component, but conditions change such that the secondary audio bud 115 maintains a connection with the source device 105 or has a better short-range connection to the source device 105, the secondary audio bud 115 may become the master component while the primary audio bud 115 may become the slave component. The system 100 may include one or more other devices that may also be present in any of the S2B link 120, the B2B link 125, the S2D link 140, or another connection with any of the devices of the system 100.

In establishing the short-range communications links (e.g., the S2B link 120, the B2B link 125, or the S2D link 140), the source device 105, the primary audio bud 110, the secondary audio bud 115, and the audio device 135 may include the necessary hardware, software, and/or firmware to perform conventional operations as well as operations according to the exemplary embodiments. In addition, during periods when the primary audio bud 110, the secondary audio bud 115, and the audio device 135 are in a low power state, these components may include the necessary hardware, software, and/or firmware for performing conventional operations as well as operations according to the exemplary embodiments.

Figure 2:
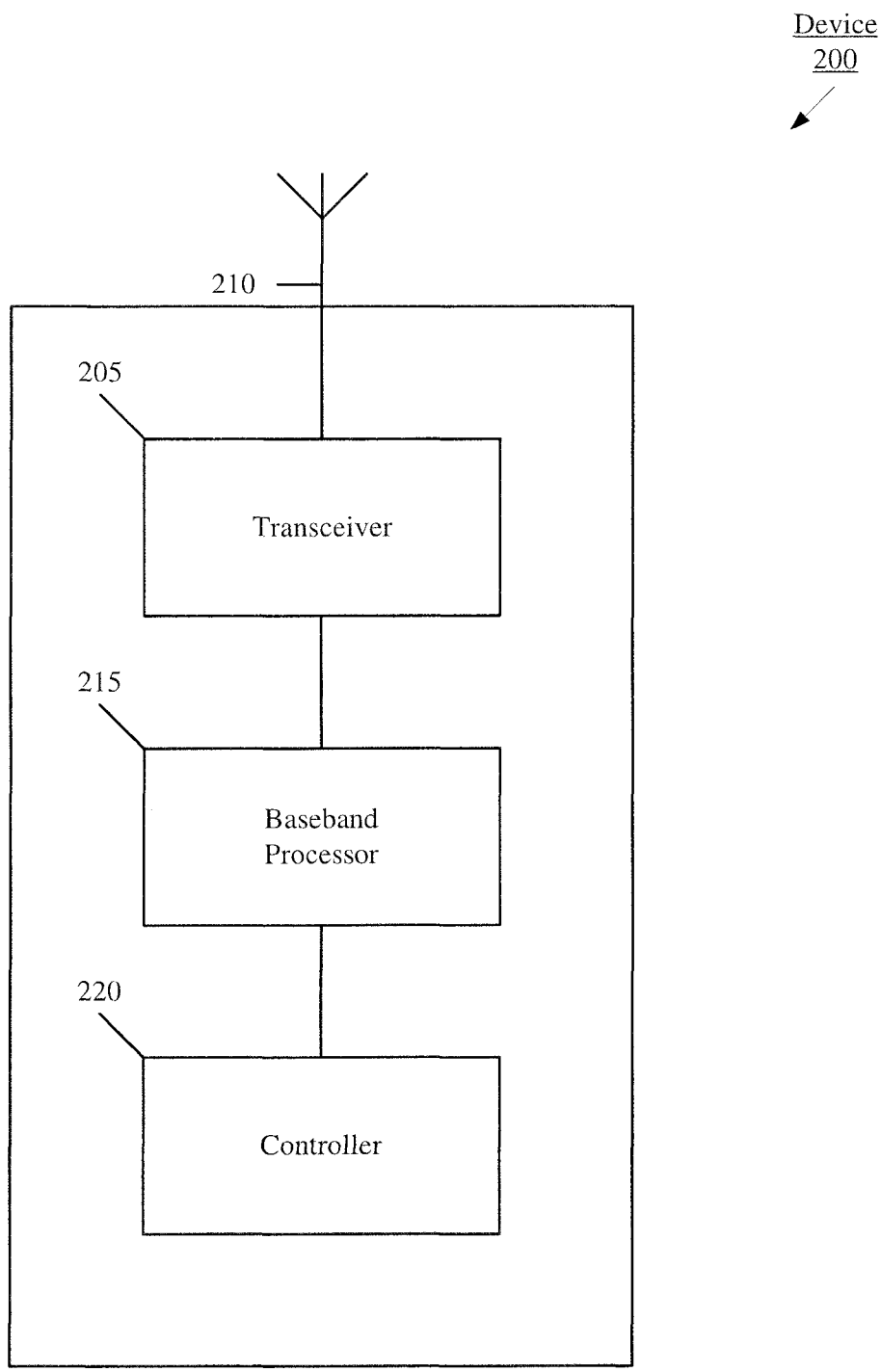
FIG. 2 shows an example device for establishing a short-range communicaiton link according to various exemplary embodiments described herein.

FIG. 2 shows a device 200 for establishing a short-range communication link and performing operations used while in a low power state according to the exemplary embodiments (e.g., a Bluetooth paging operation, a Bluetooth page scanning operation, a BLE advertisement operation, and a BLE scanning operation). The device 200 may represent any of the source device 105, the primary audio bud 110, the secondary audio bud 115, and the audio device 135. Specifically, the device 200 may represent the components that may be included to perform the conventional operations and the operations according to the exemplary embodiments.

The device 200 may include a transceiver 205 connected to an antenna 210, a baseband processor 215, and a controller 220, as well as other components (not shown). The other components may include, for example, a memory, an application processor, a battery, ports to electrically connect the device 200 to other electronic devices, etc. The transceiver 205 may be configured to exchange data over one or more connections. Specifically, the transceiver 205 may enable a short-range communication link to be established using frequencies or channels associated with the short-range communication protocol (e.g., the channels associated with a Bluetooth connection). The controller 220 may control the communication functions of the transceiver 205 and the baseband processor 215. In addition, the controller 220 may also control non-communication functions related to the other components, such as the memory, the battery, etc. Accordingly, the controller 220 may perform operations associated with an applications processor.

The baseband processor 215 may be a chip compatible with a wireless communication standard, such as Bluetooth. The baseband processor 215 may be configured to execute a plurality of operations of the device 200. For example, the operations may include the methods and operations related to the exemplary embodiments where the short-range communication link is torn down when the device 200 enters a sleep state (or lower power/reduced power state) as well as a modified advertising scheme or detection operations and the short-range communication link is subsequently established using the advertising scheme and performing corresponding connection operations. Additionally, the transceiver 205 may also be configured to execute a plurality of operations of the device 200. For example, the operations may include the methods and operations related to the exemplary embodiments.

With regard to the primary audio bud 110, the secondary audio bud 115, and the audio device 135, these devices may include further components. As will be described in further detail below, there may be available information that indicates when these devices are in use or are likely to be used. Accordingly, these devices may be equipped with further components that generate or otherwise detect this information. For example, these devices may include sensors that may identify when the devices are being used. In a particular example, the sensors may indicate a relative orientation or position (e.g., relative to one another in the case of the paired audio device 108 or relative to the user). When the sensors indicate that the device is, for example, in the user's ears, mounted over the user's head, etc., the sensors may generate sensor data that is processed to indicate that the device is being used or likely to be used. In another example, the sensors may be motion sensors. When the motion sensors detect motion from a motionless state, the motion sensors may generate motion sensor data that is processed to indicate that the user has moved (e.g., picked up) the device and is likely to use the device.

For illustrative purposes, the exemplary embodiments are described herein with regard to the audio device 135. However, those skilled in the art will appreciate that the description herein relates also to the paired audio device 108 including the primary audio bud 110. When the mechanism according to the exemplary embodiments includes further operations when implemented with the paired audio device 108 in view of the secondary audio bud 115, a corresponding description will also be provided.

Initially, the audio device 135 may be configured to be placed into one of a plurality of states. For example, the states may include any/all of a ship state, a hibernate state, a standby state, a sleep state, an idle state, a ready state, and an active state. These states may be generally separated into different categories, e.g., according to a relative power state with respect to components used in establishing a connection drawing power. As will be described below, the ship state and the hibernate state may use a lowest power state, the standby state may use an intermediary power state relative to the hibernate state, the sleep state may use a low power state, the idle state may use an intermediary power state relative to the sleep state, and the ready state and the active state may use a normal (or high/full) power state (e.g., where all connection operations are in use).

The state may relate to when the audio device 135 is being shipped from a retailer to a user/purchaser of the product. Thus, the audio device 135 including the radio (e.g., the transceiver 205) may be deactivated, thereby utilizing a lowest power state where no connection operations are being used, including Bluetooth paging and page scan operations as well as BLE advertisement and scanning operations. With regard to a user and a particular audio device 135, the ship state may be used only when the audio device 135 is being delivered to the user until a first use of any kind is registered (e.g., charging operation, power-on operation, connection operation, etc.).

The hibernate state and the standby state may relate to when the audio device 135 is inside a storage case or otherwise put into a mode that indicates the device will not be used imminently (if available). The hibernate state may be used when the audio device 135 is inside the storage case for a long period of time. Thus, the audio device 135 may utilize a lowest power state substantially similar to the ship state, as there is a low likelihood of the audio device 135 being used. In this state, the connection operations including the Bluetooth paging and page scan operations as well as the BLE advertisement and scanning operations are not used. The audio device 135 may exit the hibernate state and enter another state, e.g., the idle state (to be described below), when the audio device 135 is removed from the storage case. From the perspective of the user, placing the audio device 135 in the storage case may ensure that the radio is deactivated.

The standby state may be when the audio device 135 is inside the storage case or otherwise put into a mode that indicates the device will not be used for a relatively short period of time, e.g., when it is anticipated that the audio device 135 will be used within the next 1 minute, 5 minutes, etc. Thus, the audio device 135 may have recently been placed inside the storage case. The last used power state may be retained for a period, as the audio device 135 may be removed from the storage case within that period. For example, the last used power state before being placed into the storage case may be the idle state. The last used power state may be transitioned to the standby state for a shorter term and subsequently to the hibernate state for a longer term. Any time period can be used for transitioning from the standby state to the (e.g., at least 1 minute, 5 minutes, etc.), but power savings may increase with a faster transition.

The sleep state and the idle state may relate to when the audio device 135 has not been in use for a predetermined period of time. For example, the audio device 135 may be removed from a user's ears (e.g., in the case of audio buds), removed from a user's head (e.g., in the case of headphones), etc. The sleep state may be entered after the audio device 135 has not been in use for a relatively long period of time as compared to the idle state, which may be entered after a shorter period of time. Thus, the audio device 135 may utilize a lower power state. In contrast to the lowest power state in which no connection operations are performed, the lower power state according to the exemplary embodiments may utilize (or enable) select operations of the BLE protocol to allow the audio device 135 to still be detected. As will be described in detail below, when the audio device 135 is in the sleep state, the audio device 135 may perform or otherwise participate in BLE advertisement operations, but not implement the Bluetooth paging and page scanning operations or the BLE scanning operations. In some examples, the sleep state may be entered from the idle state after there has been little or no motion detected for a predetermined amount of time (e.g., 30 minutes, 1 hour, 2 hours, etc.). The sleep state may be exited when the audio device 135 determines that it is likely to be used (e.g., a request is received from the source device 105, motion is detected, etc).

The idle state may be implemented when the audio device 135 has not been in use for a relatively short amount of time (e.g., 1 minute, 5 minutes, 15 minutes, etc). Similar to the relationship between the hibernate state and the standby state, the audio device 135 may have recently been set to the idle state after being used. The last used power state may be retained as the audio device 135 may again be used. For example, the audio device 135 may be removed from a position corresponding to the ready state (to be described below).

The ready state and the active state may relate to when the audio device 135 is in use or is likely to be used. For example, if the audio device 135 is placed in the user's ears (e.g., in the case of audio buds), placed over or around the user's head (e.g., in the case of headphones), etc., the audio device 135 may be in use or ready to be used. In another example, if the audio device 135 is nearby or worn in an alternative location (e.g., when headphones are worn around the user's neck, when audio buds have a detected motion, etc.), the audio device 135 may be likely to be used. In view of the audio device 135 in use or likely to be used, the connection operations with the source device 105 may continue so that the S2B link 120 or the S2D link 140 are maintained.

As will be understood by those skilled in the art, the sleep state may be a low power state, during which the audio device 135 maintains a particular power usage while the audio device 135 is not in use for a relatively long period of time. An objective of reducing or minimizing the radio activity to a threshold while in the sleep state may provide improved power conservation. As noted above, the different states may be categorized in a different manner, such as where the audio device 135 is in a case (e.g., ship, hibernate, and standby), not in use (e.g., sleep and idle), and in use (e.g., ready and active). Those skilled in the art will appreciate that the most often used states are those related to not in use and in use. In between each use of the audio device 135, the audio device 135 may be in the sleep state for a significant portion of time. Accordingly, the exemplary embodiments provide a mechanism that defines how connection operations associated with an automated approach are to be used while the audio device 135 is in the sleep state.

With regard to establishing the short-range communication link, the mechanism according to the exemplary embodiments may complete this process using the operations defined by Classic Bluetooth. When the audio device 135 is in the sleep state, the source device 105 may connect to the audio device 135 and cause the audio device 135 to exit from the sleep state. As noted above, the automated approach as used in Classic Bluetooth that allows the source device 105 to connect to the audio device 135 requires that the audio device 135 implement active Bluetooth page scans while in the sleep state. These Bluetooth page scans may be performed at predetermined intervals, e.g., as required by Bluetooth. Performing the page scanning may consume power from the power supply while the audio device 135 is in the sleep state. The exemplary embodiments are configured to reduce or minimize power consumed while the audio device 135 is in the sleep state, e.g., by using different connection operations. While in the sleep state, the audio device 135 may terminate all Bluetooth paging and page scan operations as well as BLE scanning operations, while maintaining only BLE advertisement operations that can be used to detect the source device 105 (and for the source device 105 to detect and/or signal the audio device 135). Furthermore, the BLE operations may also be modified as to when they are performed to further reduce the power being consumed.

The audio device 135 may receive a scan request from the source device 105, which can cause it to exit the sleep state. Furthermore, the audio device 135 may maintain a whitelist of allowed devices to which the S2D link 140 may be established. Thus, devices on the whitelist may trigger the audio device 135 to exit the sleep state while devices not in the whitelist do not trigger any action on the audio device 135 such that the audio device 135 remains asleep. Once the audio device 135 exits the sleep state, BLE operations (e.g., advertisement and/or scanning) and Bluetooth operations (paging and/or page scan) may be performed. By removing the need to perform the Bluetooth paging and page scan operations as well as the BLE scanning operations and further modifying how the BLE advertisement operations are performed while in the sleep state, the radio of the audio device 135 may be used significantly less, which may result in improved power performance.

The exemplary embodiments may be configured with a fallback mechanism. As those skilled in the art will understand, the source device 105 may be configured to utilize Classic Bluetooth, including the paging and page scan operations, but may not be configured to utilize the BLE operations of the BLE advertisement and BLE scan operations. As the exemplary embodiments utilize the BLE operations while terminating the Classic Bluetooth connection operations in the automated approach while the audio device 135 is in the sleep state, the audio device 135 may not be configured to establish the S2D link 140 if the source device 105 is configured in this manner. Thus, the audio device 135 may utilize the fallback mechanism in which the audio device 135 may initiate a Bluetooth page scanning operation. In some embodiments, this use of the Bluetooth page scanning operation may be configured by a manual setting controlled by the user. Alternatively, the Bluetooth page scanning can be automatically enabled. For example, the Bluetooth page scanning operation may also be triggered upon occurrence of an event. In contrast to using a scan request received from the source device 105 that is configured to use the BLE operations, the fallback mechanism may trigger the Bluetooth page scanning operation when a likely use of the audio device 135 is detected. For example, the audio device 135 may be equipped with one or more sensors (e.g., motion sensors, optical sensors, etc.) that identify when the audio device 135 is likely to be used.

Returning to the mechanism according to the exemplary embodiments, a first aspect may be when the audio device 135 enters the sleep state and subsequent operations that are performed. The audio device 135 may be in the idle state (e.g., from the ready state or the active state). The audio device 135 may detect when to enter the idle state based on a variety of criteria. Exemplary criteria include the S2D link 140 only being used for control data; the audio device 135 no longer being worn on the user; the audio device 135 being placed on a stationary surface; etc. After entering the idle state, a determination may indicate that the audio device 135 has not been used upon entering the idle state for a predetermined (or threshold) period of time and is therefore to enter the sleep state. The determination to enter the sleep state may be based on the idle state. For example, the audio device 135 may determine that a current state is the idle state and that the idle state has been maintained for at least the predetermined amount of time (e.g., 30 minutes, 1 hour, 2 hours, etc.). In identifying when to enter the idle state, the audio device 135 may determine via sensors that there is no use or intention for use. For example, the sensors may indicate a position or orientation of the audio device 135 on the user, which indicates that the audio device 135 is in use (e.g., around the user's head, in the user's ears, etc.) or likely to be used (e.g., around the user's neck). In another example, the sensors may indicate motion of the audio device 135. A lack of motion can indicate that the audio device 135 is not in use, while select motions can indicate that the audio device 135 is likely to be used. The audio device 135 may utilize detected motion individually or utilize motions in combination, e.g., to make use or intent determinations.

Once the audio device 135 determines that the sleep state is to be entered, during the transition, the audio device 135 may perform one or multiple operations. In a first example, the audio device 135 may disconnect from the source device 105 and tear down the S2D link 140, when the S2D link 140 is still established. For example, the audio device 135 may have been removed from being worn by the user and placed on a nearby surface, but the user remains in a substantially similar location near the audio device 135. Thus, the S2D link 140 may still be established. In this instance, when entering the sleep state, the audio device 135 may tear down this existing S2D link 140. In another example, the audio device 135 may have been removed from being worn by the user and placed on a nearby surface, but the user has left the location such that the source device 105 is located outside an operating range of the S2D link 140. Thus, the S2D link 140 may have been severed by the time the sleep state was to be entered. In this instance, the link may have been torn down before it was determined that the audio device should enter the sleep state.

When the S2D link 140 is torn down either from the audio device 135 disconnecting the short-link communication link on entering the sleep state or from the short-link communication link being unsustainable for any of a variety of reasons prior to the audio device 135 entering the sleep state, the audio device 135 may be configured to store host connection information associated with the last S2D link 140 between the audio device 135 and the source device 105 (or some other source device to which the audio device 135 was connected). As will be described in detail below, the host connection information of the last S2D link 140 of which the audio device 135 was a member may provide information when the audio device 135 wakes from the sleep state, e.g., based on sensor data as opposed to receiving a scan request from the source device 105.

In another example of operations performed upon entering the sleep state, the audio device 135 may terminate the Bluetooth paging, the Bluetooth page scanning, and the BLE scanning operations. These connection operations may be performed in the automated approach to establishing the S2D link 140. Because of the increased power consumption from using the paging operation and both scan operations, the exemplary embodiments are configured to terminate these operations to further conserve power and reduce power usage by the audio device 135 while in the sleep state. Accordingly, the BLE advertisement operation is performed in the sleep state so that the audio device 135 may still be detected by the source device 105. The exemplary embodiments are described with regard to terminating the paging operation and both scanning operations. However, the exemplary embodiments may also utilize different selections of operations that remain or are used while in the sleep state. For example, there may be a fallback mechanism when the last connected source device 105 is not configured with the advertisement protocol under BLE. Thus, in the sleep state, the audio device 135 may still perform the Bluetooth paging operations. In another example, the audio device 135 may select to terminate the Bluetooth paging and page scan operations and maintain the BLE advertisement and scanning operations. The BLE scanning operation may draw less power than the Bluetooth scanning operation. Thus, the power conservation may still be improved from a conventional automated approach in the sleep state.

In a further example of operations performed in the sleep state, the audio device 135 may transition the BLE advertisement operations from a first interval to a second, longer interval. In addition to selecting which of the connection operations to perform, the operations that are performed may be modified. For example, the BLE advertisement operation may be modified from a standard advertisement broadcast interval (e.g., 181.25 ms) that is used prior to entering the sleep state (e.g., while in the idle state, the ready state, or the active state) to a sleep advertisement broadcast interval that is longer (e.g., twice as long at 362.5 ms). By reducing the number of BLE advertisements that are being broadcast, the audio device 135 may further conserve power and reduce power consumption. The sleep advertisement broadcast interval may be fixed, dynamic, random, etc. so long as the sleep advertisement broadcast interval is longer than the standard advertisement broadcast interval. The length of the intervals may be different from the examples used herein. For example, the BLE advertisement broadcast interval may be greater or less than the standard advertisement broadcast interval (e.g., 181.25 ms). The sleep advertisement broadcast interval may also be a different multiplier relative to the BLE advertisement broadcast interval as well as be greater or less than being twice the BLE advertisement broadcast interval (e.g., 362.5 ms).

The BLE advertisement may also be modified to change a portion of the payload. For example, when the audio device 135 enters the sleep state, the BLE advertisement operation may generate the BLE advertisement with a payload that indicates the status of the audio device 135. In this instance, the payload indicates that the audio device 135 is asleep (or in a lower power state). When continuous BLE advertisements are broadcast indicating that the audio device 135 remains asleep, the device receiving the BLE advertisement may conclude that the audio device 135 is not available to establish the S2D link 140. Thus, this device may terminate transmissions to the audio device 135 (e.g., a scan request as described below).

The BLE advertisement operation may generate BLE advertisements that are scannable. That is, when properly configured, the source device 105 may receive the BLE advertisement being broadcast from the audio device 135 during a BLE scanning operation being performed by the source device 105. Again, if the source device 105 is not configured with the advertisement protocol under BLE, the audio device 135 may revert to the fallback mechanism and utilize the Bluetooth page scanning operation instead of generating and broadcasting a BLE advertisement.

In a still further example of operations performed in the sleep state, the audio device 135 may configure the transceiver 205 to receive scan requests from the source device 105. That is, the audio device 135 may utilize a passive receiving operation in which scan requests that are transmitted from the source device 105 may be received by the audio device 135 while in the sleep state. The audio device 135 may also configure the transceiver 205 such that only source devices that are in a whitelist may be permitted to trigger operations in establishing the S2D link 140. The whitelist may be a manually generated list, an automatically generated list, or a combination thereof. As a manually generated list, a user may provide identification information to the audio device 135 that indicates the different source devices that are to be included in the whitelist. As an automatically generated list, the audio device 135 may track previous source devices to which a respective S2D link 140 was established. The audio device 135 may therefore include these previously connected source devices in the whitelist. For illustrative purposes, it may be assumed that the source device 105 is in the whitelist. The operations associated with the whitelist may be performed by, for example, a Bluetooth core controller, an applications processor, etc.

The audio device 135 may remain in the sleep state and utilize the selected operations in the modified manner until an indication is received or determined that the sleep state is to be exited. Once the audio device 135 determines that the sleep state is to be exited, during the transition, the audio device 135 may perform one or more operations. As noted above, there may be multiple ways that the audio device 135 determines that the sleep state is to be exited. In a first example exit approach, the audio device 135 may utilize the passive receiving operation in which a scan request from the source device 105 may be received, which may trigger the sleep state to be exited (e.g., if the source device 105 is in the whitelist). In a second example exit approach, the audio device 135 may determine a likely use of the audio device 135 by the user, e.g., based on sensor data from one or more sensors of the audio device 135. Each exit approach may entail a corresponding set of operations to be performed.

In the first example exit approach in which the audio device 135 receives a scan request from the source device 105, the audio device 135 may wake from the sleep state, enter the idle state, and perform a plurality of operations. In a first example, the audio device 135 may identify the source device 105 (e.g., based on an identity included in the scan request) and determine whether the source device 105 is a known device or is otherwise included in the whitelist. Initially, the source device 105 may be positioned to receive the BLE advertisement that is being broadcast by the audio device 135. Based on the BLE advertisement, the source device 105 may transmit the scan request to the audio device 135. If the source device 105 from which the scan request is transmitted is not in the whitelist, the audio device 135 may revert to the sleep state and continue the BLE advertisement operation with the modified interval. If the source device 105 is in the whitelist, the audio device 135 may then perform subsequent operations.

The subsequent operations may relate to the transition from the sleep state to the idle state. In a first example, the audio device 135 may respond to the scan request and transmit a scan response. As noted above, the BLE advertisement operation may generate the BLE advertisement with a modified payload where the sleep state of the audio device 135 is indicated. To prevent the whitelisted source device 105 from terminating a connection attempt with the audio device 135, the scan response may include an indication that the audio device 135 is awake and no longer in the sleep state (along with other information such as identification information, control information, etc.). In a second example, the audio device 135 may update the payload of the BLE advertisement. Like the scan response, the audio device 135 may now indicate in the BLE advertisement that the audio device 135 is in a non-sleep state (e.g., idle state). With the updated payload of BLE advertisements, the scan response may be selectively utilized to update the source device 105 of the change in state of the audio device 135. In a third example, the audio device 135 may update the interval in which to broadcast the BLE advertisement. The audio device 135 may revert from the sleep advertisement broadcast interval of, e.g., 362.5 ms, to the standard advertisement broadcast interval of, e.g., 181.25 ms. In a fourth example, the audio device 135 may initiate the Bluetooth page scan operation. As noted above, the mechanism used to establish the S2D link 140 may include operations used in Classic Bluetooth. Thus, the Bluetooth paging and page scan operations may be used. Accordingly, the source device 105 that has detected the audio device 135 and is now aware that the audio device 135 is not in a sleep state may begin paging the audio device 135 using Bluetooth pages. The audio device 135 may perform Bluetooth page scans to receive the Bluetooth page. In a fifth example, the audio device 135 may set an interval in which to perform the Bluetooth page scan operation. For example, the audio device 135 may use a fast scan rate in which further Bluetooth page scans are performed relative to a standard scan. The audio device 135 may use the fast scan rate for a predetermined amount of time or upon establishing the S2D link 140, thereafter setting the Bluetooth page scan to the standard scan rate. The audio device 135 may utilize these connection operations for a predetermined amount of time (e.g., 5 seconds, 10 seconds, etc.). If the audio device 135 is configured to perform further attempts, the connection operations may be cycled again for the further attempts with a break time between each attempt. If the audio device 135 fails to establish the S2D link 140, the audio device 135 may return to the sleep state and update the connection operations.

In the second example exit approach in which the audio device 135 determines a likely use, the audio device 135 may wake from the sleep state and enter the idle state to perform a plurality of operations based on other operations that are being performed while in the sleep state. While in the sleep state, sensors of the audio device 135 may be monitoring and registering sensor data such as any/all of position, orientation, movement, etc. For example, if the sensors register the audio device 135 being relatively stationary, there is a relatively low likelihood that the audio device 135 will be used. In contrast, if the sensors register a movement of the audio device 135 from a stationary state, there is a relatively high likelihood that the audio device 135 will be used. In another example, if the sensors register that the audio device 135 is now in a position corresponding to a likely use (e.g., on the user's neck) or actual use (e.g., on the user's head, in the user's ears, etc.), it may be determined that the audio device 135 will be used. Thus, using the sensor data, the audio device 135 may exit from the sleep state to the idle, ready, or active state.

Upon entering the subsequent state after waking from the sleep state, the audio device 135 may perform a plurality of operations. For example, the audio device 135 may determine if a previous source device 105 to which the audio device 135 had established a connection supports the fast scan rate. As the fast scan rate may be a feature of the connection operations in the Bluetooth standard that may not be implemented in all Bluetooth capable devices, and when the audio device 135 is configured with the fast scan rate, the audio device 135 may dynamically set the Bluetooth page scan operation with the corresponding page scan interval. Thus, if the previous source device 105 supports this functionality, the audio device 135 may set the fast scan rate. Alternatively, if the previous source device 105 does not support this functionality or a timer to use the fast scan rate has expired, the audio device 135 may set the standard scan rate. Further operations may also be performed in a substantially similar manner as the first approach described above. Specifically, the BLE advertisements may be broadcast at a new interval from the sleep advertisement (or low power) broadcast interval (e.g., 362.5 ms) to the standard advertisement broadcast interval (e.g., 181.25 ms). The BLE advertisements may modify the payload to indicate the new state of the audio device (e.g., non-sleep state).

In addition, in the second example approach, the audio device 135 may perform Bluetooth paging operations. In the second approach, the audio device 135 exits the sleep state due to sensor data and not from an indication from the source device 105. Thus, in contrast to the first approach using the scan request, which is a substantially clear indication that the source device 105 is in position to establish the S2D link 140, the second approach using the sensor data relies on an assumption that the audio device 135 will be used and further assumes that there is a source device 105 in position to establish the S2D link 140 which triggered the sensor data to indicate a likely use. Therefore, the audio device 135 may further utilize Bluetooth paging operations to transmit a Bluetooth page to the source device 105, which is performing Bluetooth page scanning operations. The audio device 135 may perform the Bluetooth paging operations for a predetermined amount of time and for one or more cycles. For example, the audio device 135 may broadcast the Bluetooth page for a predetermined amount of time of, e.g., 1 second, 5 seconds, more than 5 seconds, etc. The audio device 135 may terminate the Bluetooth paging operations early if the S2D link 140 has been established. After the predetermined time, the audio device 135 may wait for a short duration (e.g., 5 seconds, 10 seconds, etc.) and perform the Bluetooth paging operations if configured to do so. For example, the audio device 135 may use a predetermined number of Bluetooth paging operation cycles (e.g., 3 attempts, 5 attempts, etc.). If the S2D link 140 has not been established, the audio device 135 may enter an unconnected idle state. As the audio device 135 awakened from the sleep state for a predetermined reason (e.g., motion detected), the audio device 135 may enter the idle state and a timer may begin. The timer may begin while in the idle state when the sensor data no longer indicates that there is a likely use (e.g., the audio device 135 returns to a stationary disposition). When the timer expires (e.g., 30 minutes, 1 hour, 2 hours, etc.), the audio device 135 may return to the sleep state.

In another manner, the audio device 135 may reach an unconnected idle state when the scan request is received but does not result in a connection with the source device 105. Although there is a substantially clear indication that the source device 105 is in proper position to establish the S2D link 140, the audio device 135 may still fail to establish the S2D link 140 with the source device 105. For example, the Bluetooth page from the source device 105 may fail to reach the audio device 135 during a Bluetooth page scan. As noted above, if the fast scan rate is used (e.g., the source device 105 is properly configured), the audio device 135 may continue to use the fast scan rate until a predetermined time associated with using the fast scan rate has expired, upon which the audio device may return to the standard scan rate. Using either scan rate, the audio device 135 may continue to receive the Bluetooth page from the source device 105. Upon setting the Bluetooth page scanning operation to the standard scan rate, the audio device 135 may activate a sleep timer in which attempts to receive the Bluetooth page from the source device 105 that transmitted the scan request are terminated. When the sleep timer expires, the audio device 135 may determine if there is a use indication, such as the use indication corresponding to the second approach (e.g., sensor data indicating position, orientation, movement, etc. to identify a likely use). If no use indication is detected, the audio device 135 may return to the sleep state and update the connection operations. However, if there is a use indication, the audio device 135 may enter the unconnected idle state, from which it can return to the sleep state after the timer associated with entering the sleep state from the idle state expires (e.g., 30 minutes, 1 hour, 2 hours, etc.).

The audio device 135 may determine that there is a likely use based on the sensor data in a variety of ways. In a particular manner that may be implemented according to the exemplary embodiments, the sensor data may include corresponding thresholds. For example, when the sensor data indicates a motion, the motion may be required to be above a motion threshold. In this manner, the audio device 135 may exit the sleep state when there is a reasonable likelihood that the audio device 135 is intended to be used, rather than an inadvertent motion that the audio device 135 may experience.

The exemplary embodiments may also consider further features of the Bluetooth protocol. For example, the Bluetooth protocol may include a sniff connection. Those skilled in the art will understand that one type of connection that may be used in the Bluetooth protocol is a sniff mode that is a power-saving mode where the audio device 135 is less active. The sniff connection may therefore be substantially similar to a sleep state without actually being in the sleep state. Therefore, if there is a sniff connection, the audio device 135 may listen for transmissions at set intervals (e.g., 100 ms, 200 ms, etc). The sniff connection may also include a sniff anchor point that may take precedence over other operations. For example, the sniff anchor point may have a higher priority over the BLE advertisement to re-establish a sniff connection.

As indicated above, the source device 105 may also establish the S2B link 120 with the paired audio device 108. Since the paired audio device 108 includes both the primary audio bud 110 and the secondary audio bud 115, the mechanism described above may include further operations and modifications to incorporate the secondary audio bud 115 and the B2B link 125. The further operations and modifications may relate to operations that are performed by the primary audio bud 110 which, as noted above, is substantially similar to the audio device 135 relative to the source device 105.

In a first example, the primary audio bud 110 and the secondary audio bud 115 may each be equipped with the sensors. Accordingly, the primary audio bud 110 may generate sensor data in a substantially similar manner as the audio device 135. Additionally, the secondary audio bud 115 may generate sensor data detected at the secondary audio bud 115 and may transmit this sensor data to the primary audio bud 110 and/or to another device for further processing. In this manner, sensor data detected at the primary audio bud 110 and/or the secondary audio bud 115 may be used independently or in combination to determine if it is likely that the paired audio device 108 will be used.

In a second example, prior to entering the sleep state for the paired audio device 108, but after the determination has been made that the primary audio bud 110 is to enter the sleep state (in a substantially similar manner as the audio device 135), the primary audio bud 110 may determine if a secondary connection or the B2B link 125 is still established. If the B2B link 125 has been torn down, the paired audio bud 108 may enter the sleep state and perform the connection operations as described above. However, if the B2B link 125 is still established, the primary audio bud 110 may change the B2B link 125 to a sniff connection with a use time interval (e.g., 500 ms or 4 watts per timeout). Subsequently, the primary audio bud 110 may terminate the BLE scanning operations (as well as the Bluetooth paging and page scan operations if not already done) to enter a coupled sleep state with the secondary audio bud 115. The primary audio bud 110 may update the sniff settings for the sniff connection and transmit this information to the secondary audio bud 115 for its use. The secondary audio bud 115 may then terminate the BLE scanning operations (as well as the Bluetooth paging and page scan operations if not already done) to enter a coupled sleep state with the primary audio bud 110.

When the B2B link 125 is dropped (e.g., due to battery depletion, interference, range, etc.), the secondary audio bud 115 may be responsible for reestablishing the B2B link 125, e.g., using a fast connect process. In such a scenario, the secondary audio bud 115 may enable BLE scanning operations and BLE advertisement operations (e.g., broadcasting advertisements at 181.25 ms). The secondary audio bud 115 may receive an advertisement from the primary audio bud 110 to which the secondary audio bud 115 may transmit a scan request with intent to connect along with a current status. The primary audio bud 110 may follow a process to exit the sleep state and start page scans along with other connection operations. The secondary audio bud 115 pages the primary audio bud 110 and makes a connection. The primary audio bud 110 may subsequently role switch the connection, enter sniff mode, and cause the paired audio device 108 to enter the sleep state using the above described mechanism.

While the paired audio device 108 is in the sleep state, the primary audio bud 110 may be configured to perform the BLE advertisement operations and broadcast a BLE advertisement indicating a state of both the primary audio bud 110 and the secondary audio bud 115. Since the BLE advertisement from the primary audio bud 110 includes information about the secondary audio bud 115, the secondary audio bud 115 may utilize the sniff connection to update the primary audio bud 110, e.g., with sensor and/or state information, such as a motion status, a battery level, etc. With the primary audio bud 110 being responsible for performing the BLE advertisement operations, after a prolonged period of time in the sleep state, the primary audio bud 110 may utilize a greater portion of its power supply than the secondary audio bud 115, which only needs to update the primary audio bud 110 with the information noted above. To maximize efficiency and improve power usage between the primary audio bud 110 and the secondary audio bud 115 of the paired audio device 108, a coordinated bud swap may be used in which the secondary audio bud 115 may become the master and the primary audio bud 110 becomes the slave. Therefore, the secondary audio bud 115 may take over the responsibility of performing the BLE advertisement operations while the primary audio bud 110 may revert to providing update information to the secondary audio bud 115. Any subsequent swaps may be performed during the period in which the paired audio device 108 remains in the sleep state. The trigger for initiating the role swap can be based on any condition(s), such as time, battery threshold, amount of power consumed over a period, etc. Further, the role swap can be performed at any time and the period between role swaps need not be equal. The swap may be performed when there is no connection to the source device 105.

With regard to further operations performed when the paired audio device 108 exits the sleep state, a substantially opposite set of operations may be performed from the above described operations when the paired audio device 108 enters the sleep state. For example, the primary audio bud 110 and the secondary audio bud 115 may initiate BLE scan operations to establish the B2B link 125 beyond a sniff connection. Further details and an exemplary timing of when these further operations (for both entering and exiting the sleep state) are performed when the S2B link 120 and the B2B link 125 are used with the paired audio device 108 will be described in further detail below.

Figure 3:
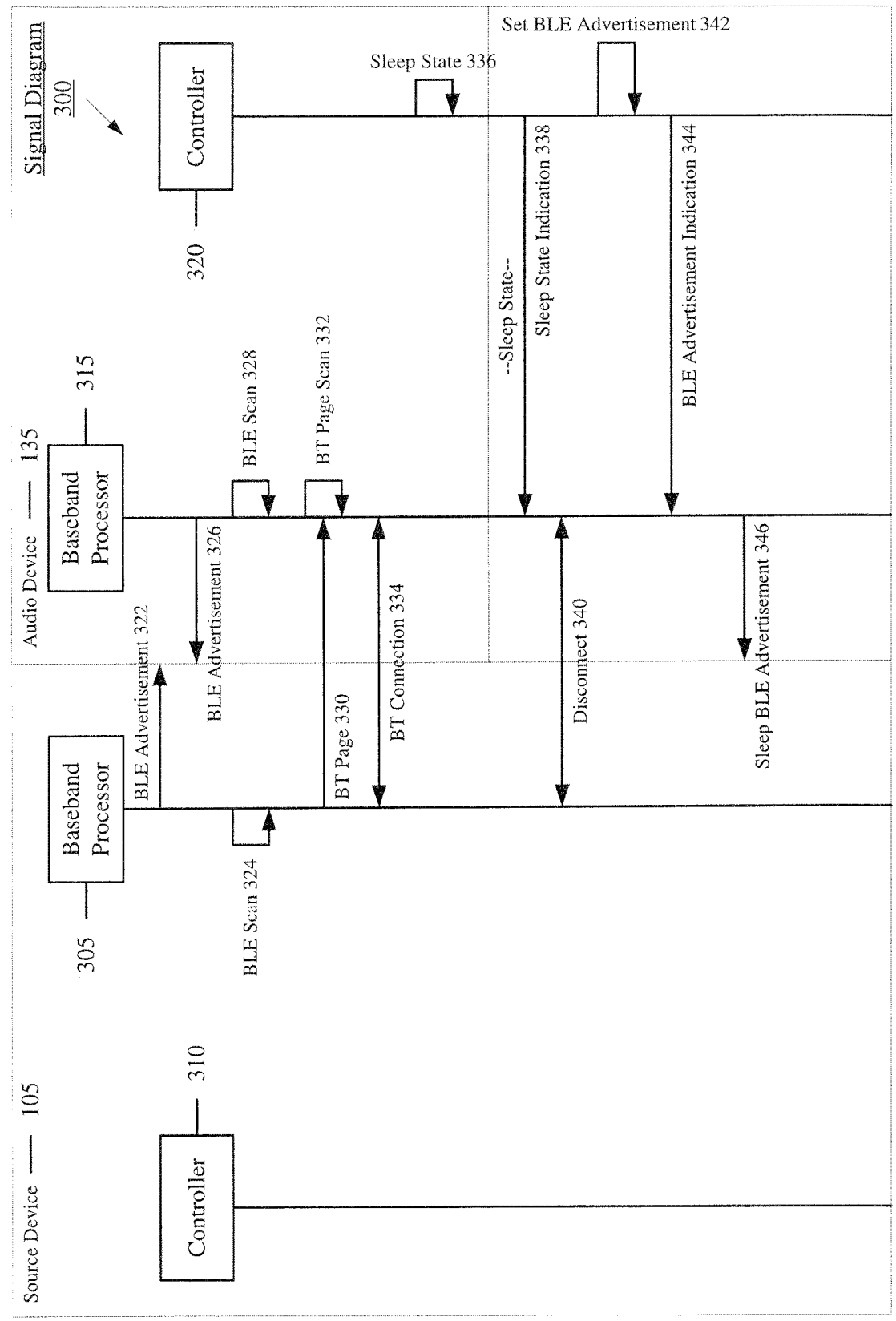
FIG. 3 shows an example signal diagram for disconnecting a short-range communication link when entering a sleep state according to various exemplary embodiments described herein.

FIG. 3 shows an example signal diagram 300 for disconnecting a short-range communication link when entering a sleep state, according to various exemplary embodiments described herein. Specifically, the signal diagram 300 illustrates an exemplary sequence of events that occur and subsequent connection operations that are performed by the audio device 135 and the source device 105 when the audio device 135 enters the sleep state from a non-sleep state (e.g., active, ready, or idle state). As shown, the signal diagram 300 may include the source device 105 including a baseband processor 305 and a controller 310 as well as the audio device 135 including a baseband processor 315 and a controller 320. For illustrative purposes, the signal diagram 300 also relates to when the S2D link 140 is established and subsequently torn down when entering the sleep state.

In the non-sleep state, the baseband processor 305 and the baseband processor 315 may perform connection operations including Bluetooth paging and page scanning operations, as well as BLE advertisement and scanning operations. For example, the baseband processor 305 may broadcast a BLE advertisement 322 and perform a BLE scan 324. The baseband processor 315 may broadcast a BLE advertisement 326 and perform a BLE scan 328. In another example, the baseband processor 305 may perform a Bluetooth page scanning operation (not shown) while the baseband processor 315 may also perform a Bluetooth page scanning operation 332. In a further example, the baseband processor 305 may transmit a Bluetooth page 330 while the baseband processor 315 may also transmit a Bluetooth page (not shown).

The connection operations may be performed at predetermined intervals. In a first example, when the baseband processor 305 or 315 enters a page state, the Bluetooth page operation may be performed to transmit a Bluetooth page (e.g., the Bluetooth page 330). In a particular embodiment, the Bluetooth paging operation may be cycled every 10 ms in the case of using 32 Bluetooth channels. In a second example, the baseband processor 305 or 315 may be configured to utilize the Bluetooth page scanning operation while in the current non-sleep state. In a particular embodiment, using a standard Bluetooth page scanning operation interval, the processor 305 or 315 may scan a Bluetooth channel for a Bluetooth page for 11.25 ms every 1.28 seconds. In a third example, the baseband processor 305 or 315 may be configured to utilize the BLE advertisement operation while in the current non-sleep state. In a particular embodiment, using a standard BLE advertisement operation interval, the baseband processor 305 or 315 may broadcast the BLE advertisement every 181.25 ms. In a fourth example, the baseband processor 305 or 315 may be configured to utilize the BLE scanning operation while in the current non-sleep state. In a particular embodiment, using a standard BLE scanning operation interval, the processor 305 or 315 may perform a BLE scan for 10 ms every 100 ms.

The above noted intervals of the connection operations are represented in the signal diagram 300. The BLE advertisement 322 and the BLE advertisement 326 may be broadcast every 181.25 ms. The BLE scan 324 and the BLE scan 328 may be performed for 10 ms every 100 ms. The BLE scan 328 on the audio device 135 may not be performed. According to another exemplary embodiment, the baseband processor 315 of the audio device 135 may only perform the BLE advertisement operation (and not perform the BLE scanning operation). Accordingly, the baseband processor 305 of the source device 105 may perform the BLE scanning operation (and may additionally perform the BLE advertisement operation). Once the advertisement protocol indicates a detection between the source device 105 and the audio device 135, the paging protocol may be used to establish the S2D link 140. For example, the Bluetooth page 330 may be cycled every 10 ms and the Bluetooth page scan 332 may be performed for 11.25 ms every 1.28 seconds. Thus, the Bluetooth connection 334 (e.g., the S2D link 140) may be established.

At a subsequent time, the controller 320 may determine that the audio device 135 may enter the sleep state 336. As described above, the audio device 135 may include sensors that generate sensor data that identify when the audio device 135 is no longer being used. For example, the paired audio device 108 may be removed from a user's ears. In another example, the audio device 135 may be placed onto a surface. When the audio device 135 is not used, the controller 320 may initially place the audio device 135 into the idle state (e.g., from the active or ready state). Once the idle state is entered, a timer may be activated so that the sleep state may be entered when the timer expires. For example, if the audio device 135 remains in the idle state for at least 2 hours (or other predetermined duration), the controller 320 may place the audio device 135 in the sleep state.

When the controller 320 determines that the audio device 135 is to enter the sleep state 336, the controller 320 may forward a sleep state indication 338 to the baseband processor 315 to tear down the Bluetooth connection 334 (as the S2D link 140 is no longer needed). Accordingly, the baseband processors 305, 315 may utilize a standard tear down procedure to disconnect 340 the Bluetooth connection 334. The signal diagram 300 assumes that the Bluetooth connection 334 is still established when the sleep state 336 is determined. However, as described above, the Bluetooth connection 334 may have already been torn down for any of a variety of other reasons.

According to the first aspect of the mechanism according to the exemplary embodiments, when it is determined that the audio device 135 is to enter the sleep state 336, the controller 320 may set how the baseband processor 315 performs the connection operations when the audio device 135 enters the sleep state. As described above, in the sleep state, the audio device 135 may terminate the Bluetooth paging and page scanning operations as well as the BLE scanning operation while leaving only the BLE advertisement operation. Thus, the controller 320 may set 342 the BLE advertisement and forward a BLE advertisement indication 344. The controller 320 may instruct the baseband processor 315 to terminate the other connection operations in a variety of manners. For example, the controller 320 may forward a separate indication (not shown) or may include the instructions in the BLE advertisement indication 344. Once the baseband processor 315 receives the BLE advertisement indication 344, the baseband processor 315 may begin performing the BLE advertisement operation by broadcasting a sleep BLE advertisement 346 at an interval that is greater than a standard interval (e.g., of 362.5 ms). The BLE advertisement indication 344 may also instruct the baseband processor 315 to update the payload of the BLE advertisement such that the sleep state of the audio device 135 is indicated.

Figure 4:
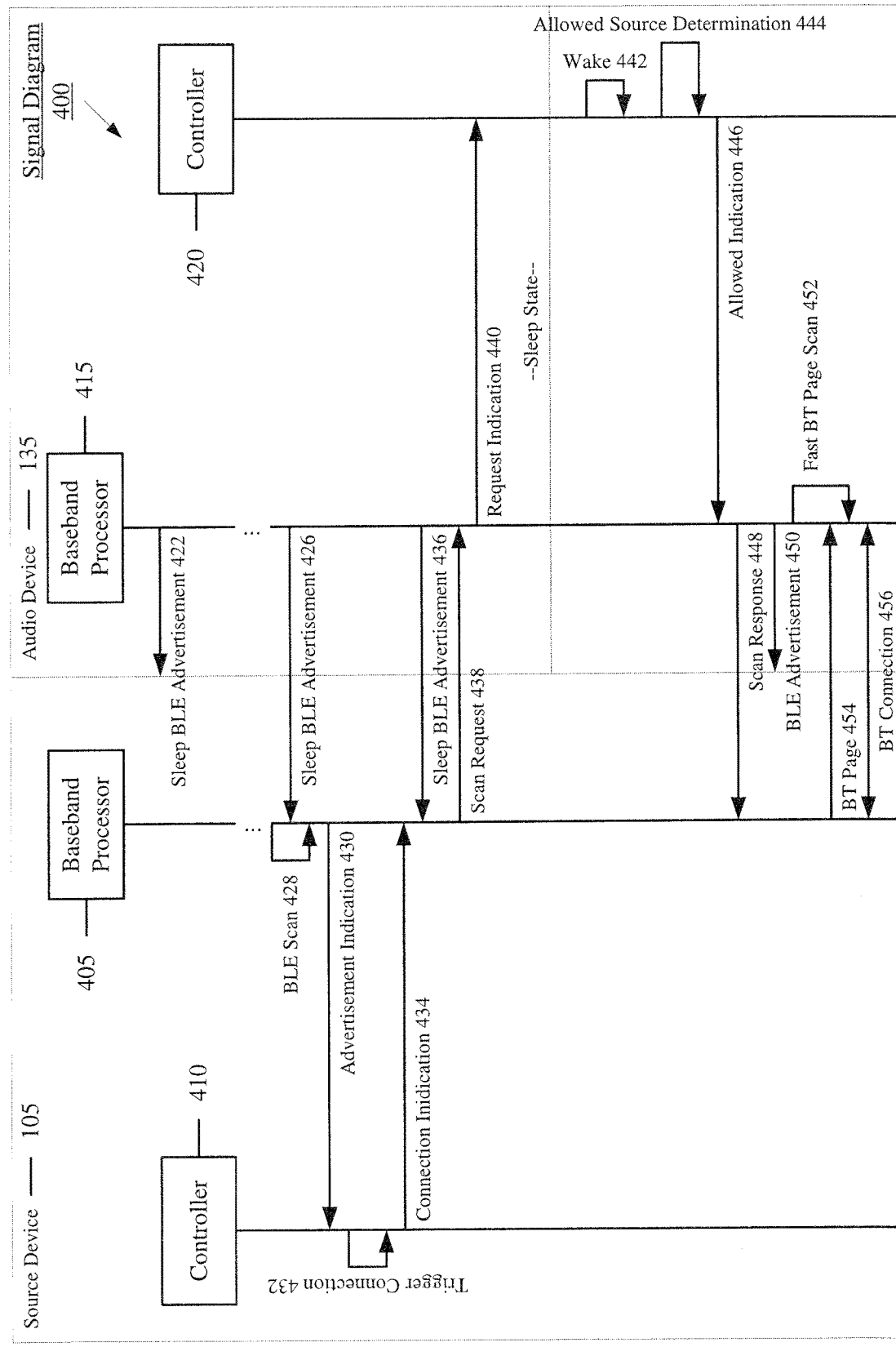
FIG. 4 shows an example signal diagram for establishing a short-range communication link when exiting a sleep state according to various exemplary embodiments described herein.

FIG. 4 shows an example, signal diagram 400 for establishing a short-range communication link when exiting a sleep state, according to various exemplary embodiments described herein. Specifically, the signal diagram 400 illustrates an exemplary sequence of events that occur and subsequent connection operations that are performed by the audio device 135 and the source device 105 when the audio device 135 exits the sleep state to enter a non-sleep state (e.g., active, ready, or idle state). As shown, the signal diagram 400 may include the source device 105 including a baseband processor 405 and a controller 410, as well as the audio device 135 including a baseband processor 415 and a controller 420. For illustrative purposes, the signal diagram 400 also relates to when the audio device 135 exits the sleep state based on a scan request being received for the S2D link 140 to be established.

In the sleep state, the baseband processor 415 may perform only the BLE advertisement operation at a modified interval. Thus, the sleep BLE advertisement 422 may be broadcast every 362.5 ms which includes a payload indicating the sleep state of the audio device 135. At a subsequent time, the source device 105 may listen for advertisements so that the source device 105 and the audio device 135 may detect one another. For example, the baseband processor 415 may broadcast a sleep BLE advertisement 426 that is received by the source device 105 during a BLE scan 428. The sleep BLE advertisement 426 may be processed and the sleep state of the audio device 135 indicated in the payload may be noted. The sleep BLE advertisement 426 being received may trigger the baseband processor 405 to forward an advertisement indication 430 to the controller 410. The advertisement indication 430 may be processed by the controller 410 to trigger 432 a connection with the audio device 135. Thus, the controller 410 may forward a connection indication 434 to the baseband processor 405. In the meantime, the baseband processor 415 may continue to broadcast the sleep BLE advertisement 436. The sleep BLE advertisements 426, 436 are shown for illustrative purposes and the distance between them is not intended to show an actual sleep broadcast interval. Thus, the advertisement indication 430, the trigger 432, and the connection indication 434 may not all occur during the interval between two sleep BLE advertisements.

When the baseband processor 405 receives the connection indication 434, the baseband processor 405 may transmit a scan request 438 to the baseband processor 415. As described above, the audio device 135 may passively listen for scan requests from source devices that are attempting to establish the S2D link 140. When the baseband processor 415 has received the scan request 438 from the source device 105, the baseband processor 415 may forward a request indication 440 to the controller 420. The controller 420 may wake 442 the audio device 135. In this instance, the controller 420 may transition the audio device 135 from the sleep state to the idle state. The controller 420 may then determine if the source device 105 is included in a whitelist of allowed source devices that may establish the S2D link 140 with the audio device 135, e.g., using the mechanism according to the exemplary embodiments. Assuming the controller 420 determines 444 that the source device 105 is allowed or is in the whitelist, the controller 420 may forward an allowed indication 446 to the baseband processor 415.

When the baseband processor 415 receives the allowed indication 446, the baseband processor 415 may transmit a scan response 448 back to the baseband processor 405. The scan response 448 may include an indication that the audio device 135 is no longer in the sleep state, but is in a non-sleep state such as the idle state, ready state, or active state. Furthermore, the allowed indication 446 may cause the payload of the BLE advertisement to be updated such that the status of the audio device 135 is now indicated as being in the non-sleep state. As noted above, the audio device 135 may indicate the change in state to the source device 105 using the scan response 448 or through the updated BLE advertisement (e.g., BLE advertisement 450). As the audio device 135 is not in the sleep state, the BLE advertisement operation may be performed using the standard BLE advertisement interval of 181.25 ms. With the scan response 448, the BLE advertisement may serve as a backup indication (e.g., if the scan response 448 does not reach the source device 105).

The scan response 448 (or the BLE advertisement 450) may cause the source device 105 to perform the Bluetooth paging operation so that the S2D link 140 may be established. The audio device 135 transitioning out of the sleep state may also activate the Bluetooth page scanning operation. According to an exemplary embodiment, the audio device 135 may utilize a fast scan rate. For example, the fast scan rate may be one or more scans each for 11.25 ms every 100 ms (versus a standard scan rate of 11.25 ms every 1.28 seconds). Again, the fast scan rate may be used for a predetermined amount of time before reverting to the standard scan rate. Thus, the audio device 135 may perform a fast Bluetooth page scan 452 during which the source device 105 may broadcast a Bluetooth page 454. Using a standard Classic Bluetooth connection procedure, the Bluetooth connection 456 (e.g., S2D link 140) may be established.

Figure 5:
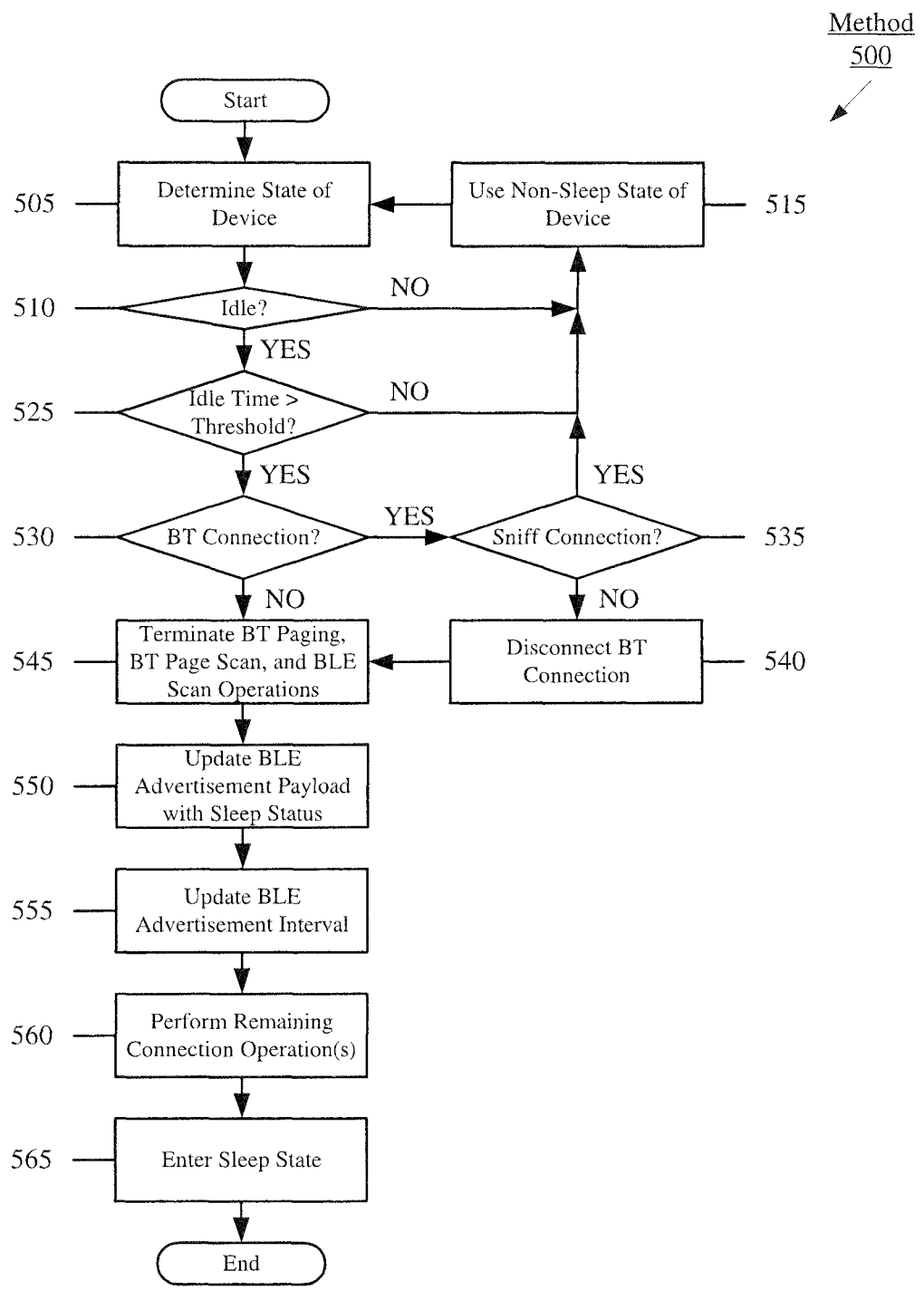
FIG. 5 shows an example method for disconnecting a short-range communicaiton link when entering a sleep state according to various exemplary embodiments described herein.

FIG. 5 shows an example method 500 for disconnecting a short-range communication link when entering a sleep state, according to various exemplary embodiments described herein. The method 500 relates to when the audio device 135 is no longer being used based on a determination from available information. That is, the method 500 relates to when the audio device 135 is in a wake state (e.g., active or ready state), but transitions first to an idle state and then to a sleep state after a predetermined time in the idle state. The method 500 includes the operations associated with tearing down the S2D link 140 with the source device 105 as well as subsequent detection operations. The method 500 will be described from the perspective of the audio device 135 in relation to the S2D link 140.

In 505, the audio device 135 determines a state. As noted above, the audio device 135 may be in any of a plurality of states, including any of a ship state, a hibernate state, a standby state, a sleep state, an idle state, a ready state, and an active state. With regard to the first aspect of the mechanism according to the exemplary embodiments related to entering the sleep state, the audio device 135 may note the idle state and the sleep state. In 510, the audio device 135 determines if the state is the idle state where the audio device 135 is currently not being used. If the audio device 135 is not in the idle state (e.g., in the active or ready state), the audio device 135 continues to 515 where the non-sleep state of the audio device 135 is used (e.g., active or ready state). If the audio device 135 is in the idle state, the audio device 135 continues to 525 where the audio device 135 determines if an amount of time that the audio device 135 has been in the idle state is greater than a predetermined threshold (e.g., 30 minutes, 1 hour, 2 hours, etc.). Upon entering the idle state, the audio device 135 may activate a timer that corresponds to the predetermined threshold. On expiry of the timer, the audio device 135 may transition from the idle state to the sleep state. If the audio device 135 has been in the idle state for less than the predetermined threshold, the audio device 135 continues to 515 where the idle state (a non-sleep state) is used. If the audio device 135 has been in the idle state for at least the predetermined threshold, the audio device 135 continues to 530, which corresponds to the audio device 135 in the sleep state.

In 530, the audio device 135 determines if the S2D link 140 is still established. Despite the audio device 135 being in the sleep state, the source device 105 may still be in position for the S2D link 140 to remain established. However, with the audio device 135 transitioning to the sleep state, the S2D link 140 may be terminated. If the S2D link 140 is still established, the audio device 135 continues to 535 to determine if there is a sniff connection. The sniff connection may be a low power state that is not the sleep state that is used by Bluetooth capable devices such as the audio device 135. If the sniff connection is present, the audio device 135 may assume that the S2D link 140 is to remain established. Thus, the audio device 135 returns to 515. Accordingly, the audio device 135 may use the idle state with the S2D link 140.

If there is no sniff connection, this may be an indication that the S2D link 140 is to be torn down. Thus, the audio device 135 may continue from 535 to 540 where the S2D link 140 is torn down and the audio device 135 continues to 545. Alternatively, returning to 530, the source device 105 may no longer be in a position to support the S2D link 140 with the audio device 135. For example, a user may take the source device 105 away from the audio device 135 such that an operating distance of the short-range communication link is exceeded. Thus, the S2D link 140 may already have been disconnected. Accordingly, the audio device 135 may continue to 545.

In 545, the audio device 135 is in the sleep state with the S2D link 140 having been torn down, and selects the connection operations that are to continue being performed. For example, in some implementations, the audio device 135 may terminate the Bluetooth paging operation, the Bluetooth page scanning operation, and the BLE scanning operation. Therefore, only the BLE advertisement operation may remain. In 550, the audio device 135 updates a payload of an advertisement to be broadcast with the BLE advertisement operation. Specifically, the update to the payload may be for the state that the audio device 135 is in currently. Thus, the audio device 135 may update the payload of the BLE advertisement to indicate to any receiving device that the audio device 135 is in the sleep state. In 555, the audio device 135 may update a rate at which the BLE advertisement is broadcast using the BLE advertisement operation. For example, the rate may be reduced. The BLE advertisement may be broadcast every 181.25 ms. However, in the sleep state, the BLE advertisement may be broadcast every 362.5 ms. Accordingly, in 560, the audio device 135 performs the remaining connection operations and in 565, the audio device 135 enters the sleep state.

The mechanism according to the exemplary embodiments with regard to a device entering a sleep state may include further operations when the source device 105 is interacting with the paired audio device 108. The method 500 may be used or modified to incorporate these further operations with the paired audio device 108 and operations that may be performed to accommodate the B2B link 125 and the secondary audio bud 115. For the examples below, it may be assumed that the primary audio bud 110 performs the operations of the method 500 and is comparable to the audio device 135 with regard to the relationship with the source device 105.

In a first example, the method 500 may incorporate further information in performing 510. For example, it may be determined whether the audio device 135 is in the idle state. Similar to the audio device 135, the primary audio bud 110 and the secondary audio bud 115 of the paired audio device 108 may each include one or more sensors that generate corresponding sensor data regarding a respective use. If the sensor data generated by the primary audio bud 110 is equivalent to the sensor data generated by the audio device 135, the sensor data generated by the secondary audio bud 115 may represent further information. Accordingly, the sensor data from both the primary audio bud 110 and the secondary audio bud 115 may provide information regarding whether the paired audio device 108 is idle or is in use or is likely to be used.

In a second example, the method 500 may incorporate a process in the primary audio bud 110 that addresses the B2B link 125. Thus, after 560, there may be a determination as to whether the B2B link 125 is still established. If the B2B link 125 is not established and has already been torn down, the primary audio bud 110 may continue to 565. However, if the B2B link 125 is still established, the primary audio bud 110 may change the B2B link 125 to a sniff connection with a use time interval (e.g., 500 ms or 4 watts per timeout). The BLE scanning operation associated with the advertisement protocol used to establish the B2B link 125 may then be terminated. Upon performing these operations, the primary audio bud 110 may enter the sleep state.

In a third example, from the perspective of the secondary audio bud 115, when the B2B link 125 is changed to a sniff connection, the primary audio bud 110 may update the sniff settings (e.g., 500 ms or 4 watts per timeout). The secondary audio bud 115 may then terminate the BLE scanning operation associated with the advertisement protocol used to establish the B2B link 125. Upon performing these operations, the secondary audio bud 115 may also enter the sleep state such that the paired audio device 108 is in the sleep state.

Figure 6:
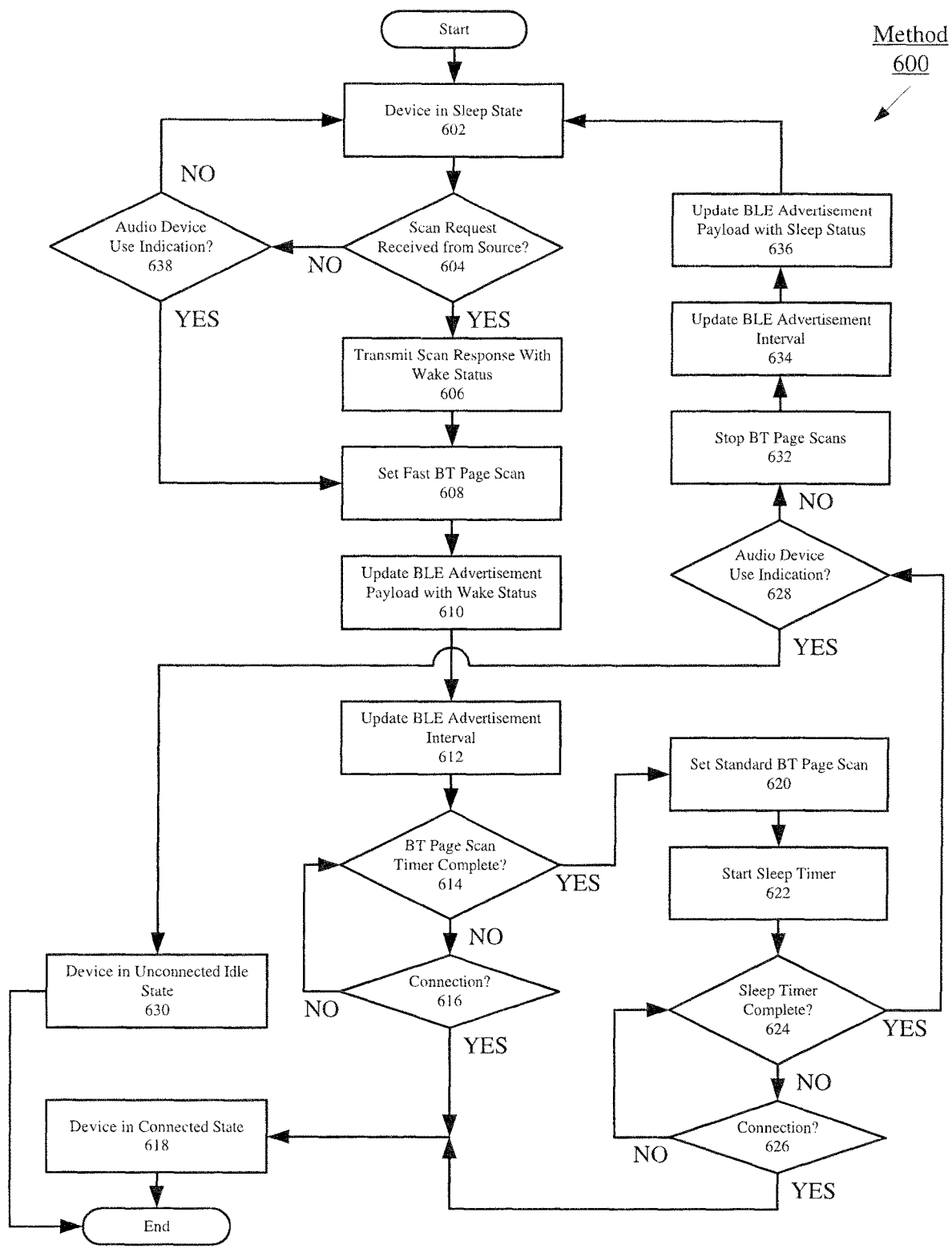
FIG. 6 shows an example method for establishing a short-range communication link when exiting a sleep state according to various exemplary embodiments described herein.

FIG. 6 shows an example method 600 for establishing a short-range communication link when exiting a sleep state according to various exemplary embodiments described herein. Specifically, the method 600 relates to when the audio device 135 is to be used based on receiving an input or a determination from available information. That is, the method 600 relates to when the audio device 135 wakes from a sleep state and the associated operations used to establish the S2D link 140 with the source device 105. The method 600 will be described from the perspective of the audio device 135 in establishing the S2D link 140.

In 602, the audio device 135 is in the sleep state. Thus, in an exemplary embodiment, the audio device 135 is performing the BLE advertisement operation to generate and broadcast a BLE advertisement at a modified interval of 362.5 ms. The audio device 135 may also be passively listening for scan requests. There may be a plurality of ways that the audio device 135 may exit the sleep state to perform subsequent operations including receiving a scan request and determining a likely use (e.g., based on sensor data).

In 604, the audio device 135 determines if a scan request has been received (e.g., from the source device 105). With the audio device 135 broadcasting the BLE advertisements, the source device 105 may have received the BLE advertisement during a BLE scan. The BLE advertisement may include an indication that the audio device 135 is currently in the sleep state. However, the source device 105 may transmit a scan request to the audio device 135 to attempt to establish the S2D link 140. If a scan request has been received, the audio device 135 may assume that the source device 105 is in position to establish the S2D link 140. Thus, as described above, the audio device 135 may exit the sleep state to a non-sleep state (e.g., the idle state) and, in 606, transmit a scan response to the source device 105 that transmitted the scan request. Prior to transmitting the scan response, the audio device 135 may determine if the source device 105 is an allowed device or in a whitelist of devices allowed to establish the S2D link 140. Thus, if the source device 105 that transmitted the scan request is allowed and/or whitelisted, the scan response may be generated and transmitted back to the source device 105. The scan request may include an indication that the audio device 135 is no longer in the sleep state. When the audio device 135 receives a scan request and the underlying assumption that the source device 105 is in position, in 608, the audio device 135 may set a fast scan rate (e.g., for 11.25 ms every 100 ms) to perform the Bluetooth page scanning operation to listen for Bluetooth pages from the source device 105. Additionally, the BLE advertisement operation may be updated in view of the audio device 135 being in a non-sleep state. Thus, in 610, the audio device 135 updates the payload of the BLE advertisement to indicate the current state as a non-sleep state and, in 612, the audio device 135 updates the interval at which to broadcast the BLE advertisement. For example, the interval may be reduced (e.g., from 362.5 ms to 181.25 ms).

In 614, the audio device 135 determines if a timer associated with performing the Bluetooth page scanning operation has expired. As noted above, the Bluetooth page scanning operation may be performed for a predetermined amount of time. For example, with the faster, more aggressive scan rate, the audio device 135 may require additional power to perform this operation. Thus, the timer may ensure that undue power is not devoted to performing this operation. If the timer has not expired, the audio device 135 continues to 616 where the audio device 135 determines if a connection has been established. That is, the audio device 135 may have received a Bluetooth page from the source device 135 and, using the Classic Bluetooth procedure, the S2D link 140 may be established. If a connection is established, the audio device 135 continues to 618 where the audio device 135 is in the connected state for the radio and the idle state (until a use or likely use is detected to transition the audio device 135 to the active or ready state, respectively). If no connection results in 616, the audio device 135 returns to 614 to continue tracking the timer.

If the timer for the Bluetooth page scanning operation using the fast scan rate expires, the audio device 135 continues from 614 to 620 where the audio device 135 reverts to a standard scan rate (e.g., for 11.25 ms every 1.28 seconds). While out of the sleep state, the audio device 135 may continue to perform the Bluetooth page scanning operation using the standard scan rate. However, there may be instances where the scan request was received but the audio device 135 will not be used and the audio device 135 should be placed back to the sleep state (after having been woken up from receiving the scan request). Thus, in 622, the audio device 135 starts a sleep timer to determine if the audio device 135 is to transition back to the sleep state. In 624, the audio device 135 determines if the sleep timer has expired. If the sleep timer has not expired, the audio device 135 continues to 626 where a determination is made as to whether a connection has been established, e.g., by performing the Bluetooth page scanning operation at the standard scan rate. If a connection has been established, the audio device 135 continues to 618 to place the radio in the connected state and the audio device 135 in the idle state. However, if no connection has been established, the audio device 135 returns to 624.

When the sleep timer expires, the audio device 135 continues from 624 to 628 where the audio device 135 determines if a use indication of the audio device 135 has been received. The use indication may be based, at least partly, on the sensor data from the one or more sensors indicating that there is likely use of the audio device 135. As noted above, the one or more sensors may generate sensor data associated with any/all of position, orientation, motion, etc. When there is a use indication, e.g., based on the sensor data, the audio device 135 continues to 630 where the audio device 135 maintains the idle state. Specifically, in 630, the audio device 135 is in an unconnected idle state. At this point, a timer may be started to determine a length of time that the audio device 135 remains in the idle state. The audio device 135 may transition from the idle state to the sleep state when the idle state has been maintained for a predetermined amount of time (e.g., 30 minutes, 1 hour, 2 hours, etc.). Thus, when the device is in the unconnected idle state, the audio device 135 may activate the timer (e.g., from the use indication being determined).

If the scan request does not result in a connection using the Bluetooth page scanning operation under the fast scan rate or the standard scan rate and no use indication has been received, the audio device 135 continues from 628 to 632 where the audio device 135 terminates the Bluetooth page scanning operation. At this point, the audio device 135 may determine that the audio device 135 is not likely to be used despite the scan request having been received. Thus, in 634, the audio device 135 increases the interval at which to generate and transmit the BLE advertisement using the BLE advertisement operation. Also, in 636, the audio device 135 may update the payload of the BLE advertisement to indicate that the audio device 135 is in the sleep state. Thus, the audio device 135 returns to 602 where the audio device is in the sleep state.

Returning to 604, if the audio device 135 does not receive a scan request, the audio device 135 continues to 638 where the audio device 135 determines if there is a use indication of the audio device 135 (in a substantially similar manner as performed in 628). If there is no use indication, the audio device 135 returns to 602 where the sleep state is maintained and the connection operations continue while in the sleep state. If there is a use indication, the audio device 135 transitions to the idle state and continues to 608 where the audio device 135 performs the Bluetooth page scanning operation with the fast scan rate.

The mechanism according to the exemplary embodiments with regard to a device entering a sleep state may include further operations when the source device 105 is interacting with the paired audio device 108. The method 600 may be used or modified to incorporate these further operations with the paired audio device 108 and operations that may be performed to accommodate the B2B link 125 and the secondary audio bud 115. For the examples below, it may be assumed that the primary audio bud 110 performs the operations of the method 600 and is comparable to the audio device 135 with regard to the relationship with the source device 105.

In a first example, after 608, the primary audio bud 110 may initiate performing the BLE scan operation to establish the B2B link 125 (assuming the B2B link 125 is not established). That is, the primary audio bud 110 may utilize a set of operations upon waking from the sleep state due to receiving a scan request. Since the primary audio bud 110 is in the idle state and not in a sleep state, the primary audio bud 110 may subsequently update the status of the B2B link 125 and a corresponding sniff rate for this short-range communication link.

In a second example, an opposite set of operations are to be performed if the primary audio bud 110 which has been awakened is to be transitioned back to the sleep state. Thus, after 636, the primary audio bud 110 may terminate the BLE scan operation for the B2B link 125. Subsequently, if the B2B link 125 is still established, the primary audio bud 110 may change the B2B link 125 to a sniff connection with corresponding sniff settings (e.g., 500 ms or 4 watts per timeout). Thereafter, the paired audio bud 108 including the primary audio bud 110 and the secondary audio bud 115 may return to 602 to return to the sleep state.

The exemplary embodiments provide a device, system, and method for a mechanism placing an accessory device in a low power state along with subsequent operations to perform while in the low power state. Specifically, when the accessory device is determined to enter the low power state, the accessory device terminates select connection operations and retains other connection operations that are performed with a modified interval. In this manner, the accessory device may optimize a power usage while in the low power state. The exemplary embodiments also provide another mechanism for the accessory device to exit the low power state along with subsequent operations to perform upon exiting the low power state. Specifically, when the accessory device exits the low power state based on receiving a request or determining a likely use, the accessory device updates the connection operations to establish a link with a source device.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or scope of the disclosure. Thus, it is intended that the present disclosure cover the modifications and variations of this disclosure provided they come within the scope of the appended claims and their equivalents.

What is claimed is:

1. A method, comprising:
at a first device configured to establish a connection over a short-range communication link with a second device:
transitioning the first device to a sleep state;
terminating (i) a paging operation and a page scanning operation associated with a paging protocol and (ii) an advertisement scanning operation associated with an advertisement protocol; and
performing an advertisement broadcast operation associated with the advertisement protocol, the advertisement broadcast operation generating an advertisement to be broadcast at a first interval, wherein the first interval is greater than a second interval for performing advertisement broadcast operations in an active state.

2. The method of claim 1, further comprising:
determining whether the short-range communication link between the first device and the second device is connected; and
when the short-range communication link is connected, tearing down the short-range communication link.

3. The method of claim 1, wherein the first device is in an idle state prior to transitioning to the sleep state.

4. The method of claim 1, further comprising:
after transitioning to the sleep state, listening for a request from the second device to establish the short-range communication link.

5. The method of claim 1, further comprising:
updating a payload of the advertisement with data indicating that the first device is in the sleep state.

6. The method of claim 1, wherein the first interval is 362.5 ms and the second interval is 181.25 ms.

7. The method of claim 1, further comprising:
transitioning the first device to a non-sleep state based at least in part on one of receiving a request from the second device or determining that the first device is likely to be used.

8. The method of claim 7, further comprising:
when a probability that the first device is to be used is greater than a predetermined threshold, transitioning the first device to the non-sleep state;
activating the page scanning operation to listen for a page from the second device; and
when the page is received from the second device, establishing the short-range communication link between the first device and the second device.

9. The method of claim 8, further comprising:
determining whether the second device has been designated an allowed device for establishing the short-range communication link.

10. The method of claim 8, wherein the request includes an identity of the second device.

11. The method of claim 10, further comprising:
determining, based at least in part on the identity, whether the second device is permitted to establish the short-range communication link.

12. The method of claim 7, further comprising:
updating a payload of the advertisement to indicate that the first device exited the sleep state and is in the non-sleep state.

13. The method of claim 1, wherein the short-range communication link comprises a Bluetooth link.

14. A first device configured to establish a connection via a short-range communication link with a second device, the first device comprising:
a transceiver configured to establish the connection; and
a processor configured to transition the first device to a sleep state, the processor instructing the transceiver to terminate (i) a paging operation and a page scanning operation associated with a paging protocol and (ii) an advertisement scanning operation associated with an advertisement protocol;
the processor instructing the transceiver to perform an advertisement broadcast operation associated with the advertisement protocol, the advertisement broadcast operation generating an advertisement to be broadcast at a first interval greater than a second interval for performing advertisement broadcast operations in an active state.

15. The first device of claim 14, wherein the processor further determines whether the short-range communication link between the first device and the second device is connected, and wherein, when the short-range communication link is connected, the processor further instructs the transceiver to tear down the short-range communication link.

16. The first device of claim 14, wherein the first device is in an idle state prior to transitioning to the sleep state.

17. The first device of claim 14, wherein, after transitioning to the sleep state, the processor further instructs the transceiver to listen for a request from the second device to establish the short-range communication link.

18. The first device of claim 14, wherein the first interval is 362.5 ms and the second interval is 181.25 ms.

19. The first device of claim 14, wherein the short-range communication link comprises a Bluetooth link.

20. A method, comprising:
at a first device configured to establish a connection over a short-range communication link with a second device:
transitioning the first device from a sleep state to a non-sleep state;
activating a page scanning operation associated with a paging protocol to listen for a page from the second device; and updating an advertisement broadcast operation associated with an advertisement protocol, the advertisement broadcast operation generating an advertisement to be broadcast at a first interval that is less than a second interval for performing advertisement broadcast operations during the sleep state, wherein a paging operation associated with the paging protocol and an advertisement scanning operation associated with the advertisement protocol remain inactive.

* * * * *